(12) United States Patent
Schwerdtner (10) Patent No.: US 7,839,548 B2
(45) Date of Patent: *Nov. 23, 2010

(54) VIDEO HOLOGRAM AND DEVICE FOR RECONSTRUCTING VIDEO HOLOGRAMS

(75) Inventor: Armin Schwerdtner, Dresden (DE)

(73) Assignee: SeeReal Technologies GmbH, Dresden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/534,877
(22) PCT Filed: Nov. 11, 2003
(86) PCT No.: PCT/DE03/03791

§ 371 (c)(1),
(2), (4) Date: May 12, 2005

(87) PCT Pub. No.: WO2004/044659

PCT Pub. Date: May 27, 2004

(65) Prior Publication Data

US 2006/0055994 A1    Mar. 16, 2006

(30) Foreign Application Priority Data

Nov. 13, 2002    (DE) ............................ 102 53 292 U (51) Int. Cl.
*G03H 1/08* (2006.01)
(52) U.S. Cl. ................. 359/9; 359/23; 359/29
(58) Field of Classification Search .............. 359/9, 359/23, 25, 32, 15, 443, 29; 348/42
See application file for complete search history.

(56) References Cited

U.S. PATENT DOCUMENTS 3,957,353 A    5/1976  Fienup et al.

(Continued)

FOREIGN PATENT DOCUMENTS

GB    2 363 273    12/2001

(Continued)

OTHER PUBLICATIONS

U.S. Appl. No. 11/937,991, dated Nov. 2007, Schwerdtner, Armin, 359/9.*

(Continued)

*Primary Examiner*—Audrey Y Chang
(74) *Attorney, Agent, or Firm*—Saul Ewing LLP (57) ABSTRACT

The invention relates to video holograms and devices for reconstructing video holograms, comprising an optical system that consists of a light source, lens and the video hologram that is composed of cells arranged in a matrix or a regular pattern with at least one opening per cell, the phase or amplitude of said opening being controllable. The video holograms and devices for reconstructing the same are characterized in that holographic video representations of expanded spatial objects can be achieved in a wide viewing area in real time using controllable displays, whereby the objects are either computer-generated or created by different means. The space-bandwidth product (SBP) of the hologram is thus reduced to a minimum and the periodicity interval of the Fourier spectrum is used as a viewing window on the inverse transformation plane, through which the object is visible in the preceding space. The mobility of the viewer(s) is achieved by tracking the viewing window. The invention can be advantageously used in the television, multimedia, games and construction fields, in military and medical technology, in addition to other economic and social areas.

45 Claims, 7 Drawing Sheets

U.S. PATENT DOCUMENTS

| | | | |
|---|---|---|---|
| 5,191,449 | A | 3/1993 | Newswanger |
| 5,760,933 | A | 6/1998 | Aritake et al. |
| 5,798,864 | A | 8/1998 | Sekiguchi |
| 5,889,599 | A | 3/1999 | Takemori |
| 6,330,088 | B1 | 12/2001 | Klug et al. |
| 6,462,869 | B1* | 10/2002 | Gutjahr ..................... 359/443 |
| 6,665,100 | B1* | 12/2003 | Klug et al. .................... 359/23 |
| 6,710,920 | B1 | 3/2004 | Mashitani et al. |
| 7,002,619 | B1 | 2/2006 | Dean et al. |
| 7,053,925 | B2* | 5/2006 | Payne et al. .................... 348/42 |
| 7,230,746 | B2* | 6/2007 | Cameron et al. ................ 359/9 |
| 7,315,408 | B2* | 1/2008 | Schwerdtner ................... 359/9 |
| 2004/0263930 | A1* | 12/2004 | Payne ........................... 359/32 |
| 2006/0055994 | A1 | 3/2006 | Schwerdtner |
| 2006/0139711 | A1* | 6/2006 | Leister et al. ................... 359/9 |
| 2006/0238836 | A1* | 10/2006 | Schwerdtner ................... 359/9 |
| 2006/0238838 | A1* | 10/2006 | Schwerdtner ................... 359/9 |
| 2006/0238839 | A1* | 10/2006 | Schwerdtner ................... 359/9 |
| 2006/0238840 | A1 | 10/2006 | Schwerdtner |
| 2006/0238843 | A1* | 10/2006 | Schwerdtner ................ 359/15 |
| 2006/0238844 | A1* | 10/2006 | Schwerdtner ................ 359/32 |
| 2008/0252950 | A1 | 10/2008 | Schwerdtner |

FOREIGN PATENT DOCUMENTS

| | | |
|---|---|---|
| JP | 2002-182548 | 6/2002 |
| WO | 99/00993 | 1/1999 |
| WO | WO 00/03309 | 1/2000 |
| WO | WO 01/95016 | 12/2001 |

OTHER PUBLICATIONS

"Viewing-zone enlargement method for sampled hologram that uses high-order diffraction" Applied Optics vol. 41 No. 8, Mishina et al.

"Combination enlargement method of viewing zone for computer-generated holography" SPIE vol. 3956 (2000), Mishina et al.

"Electro-holographic Display using 15 mega pixels LCD" SPIE vol. 2652/15, Maeno et al.

"Expansion of the image size and viewing zone in holographic display using liquid crystal devices" SPIE vol. 2406/283, Fukaya et al.

"Eye-position tracking type electro-holographic display using liquid crystal devices" Asia Display '95, Fukaya et al.

"Computer-generated Binary Holograms," IBM J.Res Develop, Brown/Lohmann.

"Characteristics of three-dimensional reconstructed images from a computer generated hologram" Electr. & Comm. In JP vol. 62-C, Onoe/Kaneko.

"Computational challenges of emerging novel true 3D holographic displays" SPIE vol. 4109 (2000), Cameron, Pain, Stanley, Stinger.

"Introduction to Fourier Optics" p. 118/119, Goodman 2nd Ed.

"Basic demonstration in diffractive and Fourier optics: use your eye as a Fourier transformer" SPIE vol. 3190, Stijns Erik.

Office Action, dated May 16, 2007, issued in related German Application No. 103 53 439.3-51 (in German with English translation).

International Search Report, dated May 18, 2004, issued in priority International Application No. PCT/DE03/03791.

English translation of Office Action, dated Aug. 30, 2007, issued in related Korean Application No. 10-2005-7008370.

English translation of Office Action, dated May 25, 2006, issued in related Russian Application No. 2005118086/28 (020557).

Office Action, dated Feb. 13, 2007, issued in Singapore Application No. 200502601-8.

English translation of Office Action, dated Jan. 29, 2009, issued in related Korean Application No. 10-2008-7005127.

Examination Report, dated Sep. 2, 2008, issued in Philippine Application No. 1-2005-500748.

English translation of Office Action, dated Dec. 28, 2007, issued in related Chinese Application No. 200380103105.X.

European Search Report, dated Sep. 8, 2005, issued in related European Application No. 03 788 795.7 (German only).

Examination Report, dated Mar. 17, 2006, issued in related Indian Application No. 1221/CHENP/2005.

* cited by examiner

VIDEO HOLOGRAM AND DEVICE FOR RECONSTRUCTING VIDEO HOLOGRAMS

BACKGROUND OF THE INVENTION

The present invention relates to a video hologram and a device for reconstructing video holograms comprising an optical system, that consists of at least one light source, a lens and a hologram-bearing medium composed of cells arranged in a matrix or an otherwise regular pattern with at least one opening per cell, the phase or amplitude of said opening being controllable, and a viewing plane located in the image plane of the light source.

Devices for reconstructing video holograms using acousto-optical modulators (AOM) are known from prior art (Stephen A. Benton, Joel S. Kollin: Three dimensional display system, U.S. Pat. No. 5,172,251). Such acousto-optical modulators transform electric signals into optical wave fronts, which are recomposed in a video frame using deflection mirrors to form two-dimensional holographic areas. A scene visible for the viewer is reconstructed from the individual wave fronts using further optical elements. The optical means used, such as lenses and deflection elements, have the dimensions of the reconstructed scenes. Due to their great depth, these elements are voluminous and heavy. It is difficult to miniaturise them, so that their range of applications is limited.

Another possibility to generate large video holograms is provided by the so-called "tiling method", using computer-generated holograms (CGH). In this method, known from WO 00/75698 A1 and U.S. Pat. No. 6,437,919 B1, small CGHs having a small pitch are composed with the help of an optical system. For this, in a first step, the required information is written to fast matrices having a small pitch (usually EASLM [electronically addressable spatial light modulators]), and then the matrices are reproduced on to a suitable holographic medium and composed to form a large video hologram. Usually, an optically addressable spatial light modulator (OASLM) is used as holographic medium. In a second step, the composed video hologram is reconstructed with coherent light in transmission or reflection.

In the CGH with controllable openings arranged in a matrix or in an otherwise regular pattern, known e.g. from WO 01/95016 A1 or Fukaya et al., "Eye-position tracking type electro-holographic display using liquid crystal devices", Proceedings of EOS Topical Meeting on Diffractive Optics, 1997, the diffraction on small openings is taken advantage of for encoding the scenes. The wave fronts emerging from the openings converge in object points of the three-dimensional scene before they reach the viewer. The smaller the pitch, and thus the smaller the openings in the CGHs, the greater is the diffraction angle, i.e. the viewing angle. Consequently, with these known methods enlarging the viewing angle means to improve the resolution.

As is generally known, in Fourier holograms the scene is reconstructed as a direct or inverse Fourier transform of the hologram in a plane. This reconstruction is continued periodically at a periodicity interval, the extension of said periodicity interval being inversely proportional to the pitch in the hologram.

If the dimension of the reconstruction of the Fourier hologram exceeds the periodicity interval, adjacent diffraction orders will overlap. As the resolution is gradually decreased, i.e. as the pitch of the openings rises, the edges of the reconstruction will be distorted increasingly by overlapping higher diffraction orders. The usable extent of the reconstruction is thus gradually limited.

If greater periodicity intervals and thus greater viewing angles are to be achieved, the required pitch in the hologram comes closer to the wavelength of the light. Then, the CGHs must be sufficiently large in order to be able to reconstruct large scenes. These two conditions require a large CGH having a great number of openings. However, this is currently not feasible in the form of displays with controllable openings (see EP 0992163 B1). CGH with controllable openings only measure one to several inches, with the pitches still being substantially greater than 1 µm.

The two parameters, pitch and hologram size, are characterised by the so-called space-bandwidth product (SBP) as the number of openings in the hologram. If the reconstruction of a CGH with controllable openings that has a width of 50 cm is to be generated so that a viewer can see the scene at a distance of 1 m and in a 50-cm-wide horizontal viewing window, the SBP in horizontal direction is about $0.5 \cdot 10^6$. This corresponds to 500,000 openings at a distance of 1 µm in the CGH. Assuming an aspect ratio of 4:3, 375,000 openings are required in the vertical direction. Consequently, the CGH comprises $3.75 \cdot 10^{11}$ openings, if three colour sub-pixels are taken into consideration. This number will triplicate if the fact is taken into account that the CGH with controllable openings usually only allows the amplitudes to be affected. The phases are encoded taking advantage of the so-called detour phase effect, which requires at least three equidistant openings per sampling point. SLM having such a great number of controllable openings are hitherto unknown.

The hologram values must be calculated from the scenes to be reconstructed. Assuming a colour depth of 1 Byte for each of the three primary colours and a frame rate of 50 Hz, a CGH requires an information flow rate of $50*10^{12}=0.5*10^{14}$ Byte/s. Fourier transformations of data flows of this magnitude exceed the capabilities of today's computers by far and do thus not allow holograms to be calculated based on local computers. However, transmitting such an amount of data through data networks is presently unfeasible for normal users.

In order to reduce the enormous number of computations it has been proposed not to calculate the entire hologram, but only such parts of it that can be seen directly by the viewer, or such parts that change. The kind of hologram which consists of addressable sub-regions, such as the above-mentioned "tiling hologram", is disclosed in the above-mentioned patent specification WO 01/95016 A1. Starting point of the calculations is a so-called effective exit pupil, the position of which can coincide with the eye pupil of the viewer. The image is tracked as the viewer position changes by continuous recalculation of the hologram part that generates the image for the new viewer position. However, this partly nullifies the reduction in the number of computations.

The disadvantages of the known methods can be summarised as follows: Arrangements with acousto-optical modulators are too voluminous and cannot be reduced to dimensions known from state-of-the-art flat displays; video holograms generated using the tiling method are two-stage processes which require enormous technical efforts and which cannot easily be reduced to desktop dimensions; and arrangements based on SLM with controllable openings are too small to be able to reconstruct large scenes. There are currently no large controllable SLM with extremely small pitches, which would be needed for this, and this technology is further limited by the computer performance and data network bandwidth available today.

It is an objective of the present invention to circumvent the above-mentioned disadvantages and to provide extended real-time reconstructions of video holograms at large viewing angles.

According to the present invention, this objective is solved in an inventive manner by a video hologram and a device for reconstructing video holograms having the features of claim 1. Preferred embodiments of the invention are laid down in claims 2 to 10.

SUMMARY OF THE INVENTION

The video holograms and devices for reconstructing video holograms with controllable openings according to the present invention are characterised in that in the viewing plane at least one viewing window is formed in a periodicity interval as a direct or inverse Fourier transform of the video hologram, said viewing window allowing a viewer to view a reconstruction of a three-dimensional scene. The maximal extent of the viewing window corresponds to the periodicity interval in the plane of the inverse Fourier transformation in the image plane of the light source. A frustum stretches between the hologram and the viewing window, said frustum containing the entire three-dimensional scene as Fresnel transform of the video hologram.

The viewing window in the present invention is limited approximately to and positioned in relation to one eye, an eye distance of a viewer or to another suitable area.

Now, in this invention, another viewing window is provided for the other eye of the viewer. This is achieved by the fact that the observed light source is displaced or added a second, real or virtual, adequately coherent light source at another suitable position to form a pair of light sources in the optical system. This arrangement allows the three-dimensional scene to be seen with both eyes through two associated viewing windows. The content of the video hologram can be changed, i.e. re-encoded, according to the eye position in synchronism with the activation of the second viewing window. If several viewers view the scene, more viewing windows can be generated by turning on additional light sources.

As regards another aspect of the present invention of the device for reconstructing a video hologram, the optical system and the hologram-bearing medium are arranged so that the higher diffraction orders of the video hologram have a zero point for the first viewing window or an intensity minimum at the position of the second viewing window. This prevents the viewing window for one eye to cross-talk the other eye of the viewer or to other viewers. It is thus taken advantage of the decrease in intensity of the light towards higher diffraction orders, which is due to the finite width of the openings of the hologram-bearing medium and/or the minima of the intensity distribution. The intensity distribution for rectangular openings, for example, is a $sinc^2$ function which rapidly decreases in amplitude and forms a $sin^2$ function which decreases as the distance grows.

The number of openings in the display determines the maximum number of values that must be calculated for the video hologram. The transmission of data from a computer or through a network to the display representing the video hologram is limited to the same number of values. The data flow rate does not substantially differ from the data flow rates known from typical displays used today. Now, this will be illustrated with the help of an example.

If the viewing window is reduced, for example, from 50 cm (horizontal) by 37.5 cm (vertical) to 1 cm by 1 cm by choosing a sufficiently low-resolution display, the number of openings in the hologram will drop to $1/1875$. The required bandwidth is reduced in the same way during data transmission through a network. Video holograms created with known methods require $10^{12}$ openings, while this number is reduced to $5 \cdot 10^8$ pixels in this example. The scene can be viewed in full through the remaining viewing window. These requirements on pitch and hologram size according to the space-bandwidth product can already be fulfilled by displays available today. This allows to inexpensively realise large real-time video holograms on displays with large pitch for a large viewing window.

The viewing window is tracked by mechanically or electronically displacing the light sources, by using movable mirrors or by using light sources which can be adequately positioned in any other way. The viewing windows are displaced according to the displacement of the light source images. If the viewer moves, the light source(s) is (are) spatially displaced so that the viewing windows follow the eyes of the viewer(s). This is to ensure that the viewers can also see the reconstructed three-dimensional scene when they move, so that their freedom of movement is not limited. Several systems are known for detecting the position of the viewers, e.g. systems based on magnetic sensors can be used beneficially for this.

This invention also allows to reconstruct a video hologram efficiently in colour. Here, the reconstruction is performed with at least three openings per cell, representing the three primary colours, amplitude or phase of said openings being controllable, and said openings being encoded individually for each of the primary colours. Another possibility of reconstructing a video hologram in colour is to perform at least three reconstructions one after another, namely for the individual primary colours, using the device of the present invention.

The present invention allows to efficiently generate holographic reconstructions of spatially extended scenes through controllable displays, such as TFT flat screens, in real-time and providing large viewing angles. These video holograms can be used beneficially in TV, multimedia, game and design applications, in the medical and military sectors, and in many other areas of economy and society. The three-dimensional scenes can be generated by a computer or in any other way.

BRIEF DESCRIPTION OF THE DRAWINGS

An embodiment of the present invention is illustrated and explained below in conjunction with the accompanying drawings, wherein.

DETAILED DESCRIPTION OF THE INVENTION

A device for reconstructing video holograms comprises the hologram-bearing medium, a sufficiently coherent, real or virtual, point or line-shaped light source and an optical system. The video hologram-bearing medium itself consists of cells which are arranged in a matrix or in an otherwise regular pattern with at least one opening per cell, the phase or amplitude of said opening being controllable. The optical system for reconstructing the video hologram can be realised by an optical imaging system known in the art, consisting of a point or line laser or a sufficiently coherent light source.

Figure 1:
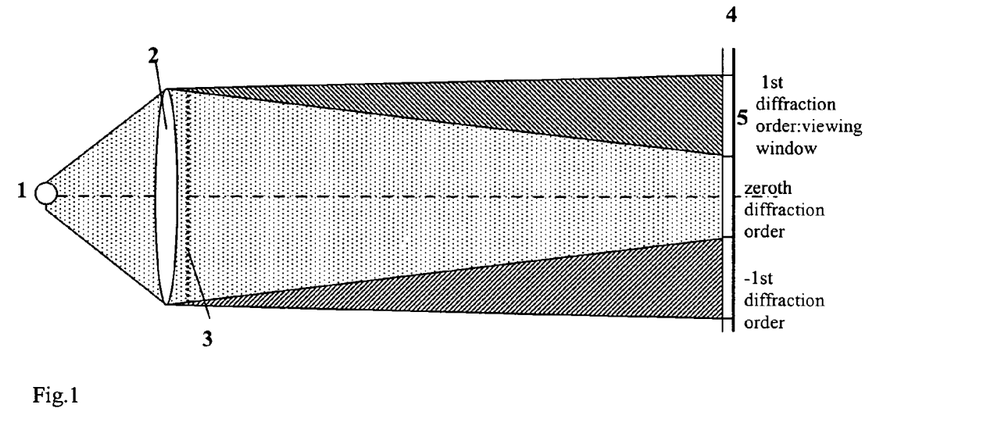
FIG. 1 is a general illustration of a video hologram and a device for reconstructing video holograms showing the generation of the diffraction orders and the position of a viewing window.
Figure 1A:
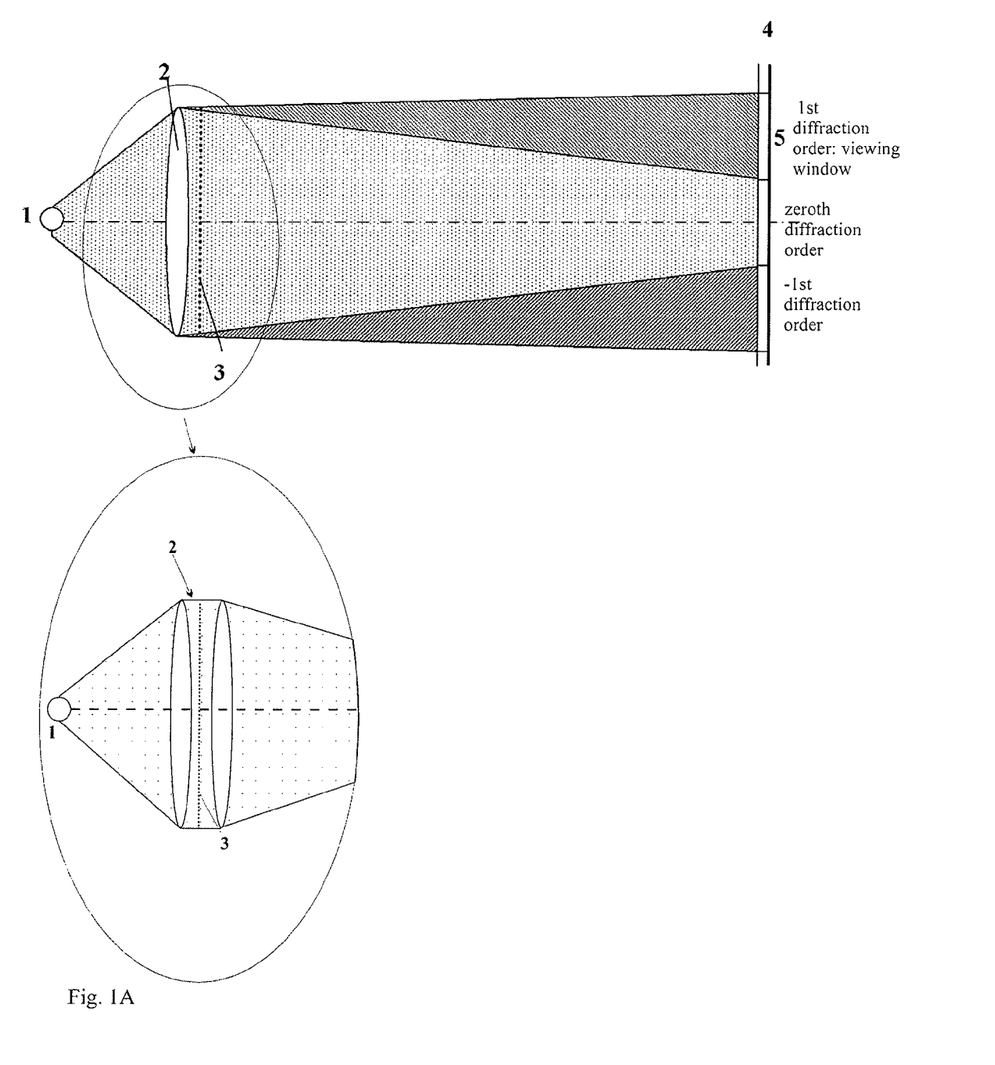
FIG. 1a shows the content of FIG. 1 with a magnified view of an example of a focusing lens system 2 comprising two single lenses.

FIG. 1 shows the general arrangement of a video hologram and its reconstruction. A light source 1, a focusing lens system 2, shown as a single lens, for the purpose of simplicity, a hologram-bearing medium 3 and a viewing plane 4 are arranged one after another, seen in the direction of the propagating light. The viewing plane 4 corresponds with the Fourier plane of the inverse transform of the video hologram with the diffraction orders. FIG. 1A shows the content of FIG. 1 with a magnified view of an example of a focusing lens system 2 comprising two single lenses.

Figure 3:
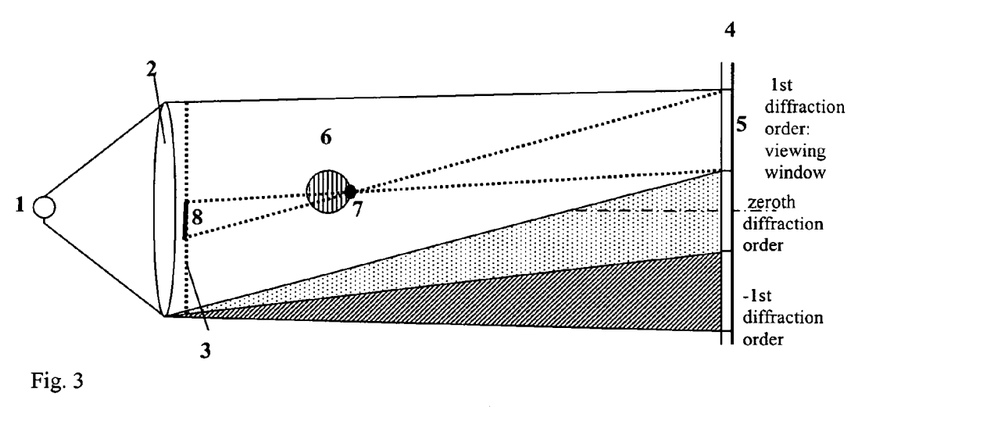
FIG. 3 is a general illustration of a device for reconstructing video holograms showing the encoding of the three-dimensional scene in a part of the video hologram.

The light source 1 is imaged on to the viewing plane 4 through an optical system, represented by the lens system 2. If a hologram-bearing medium 3 is inserted, it (the hologram-bearing medium 3 being encoded with a hologram) is reconstructed to comprise focal points (e.g., a point 7 of a reconstructed three-dimensional scene 6 as shown in FIG. 3) before the viewing plane 4 (i.e., between the hologram-bearing medium 3 and the viewing plane 4) and as an inverse Fourier transform in the viewing plane 4. The hologram-bearing medium 3 with periodic openings creates equidistantly staggered diffraction orders in the viewing plane 4, where the holographic encoding into higher diffraction orders takes place, e.g. by way of the so-called detour phase effect. Because the light intensity decreases towards higher diffraction orders, the $1^{st}$ or $-1^{st}$ diffraction order is used as the viewing window 5. If not explicitly expressed otherwise, the $1^{st}$ diffraction order will be taken as a basis in the further description of the invention.

The dimension of the reconstruction was chosen here to correspond with the dimension of the periodicity interval of the $1^{st}$ diffraction order in the viewing plane 4. Consequently, higher diffraction orders are attached without forming a gap, but also without overlapping.

Figure 2:
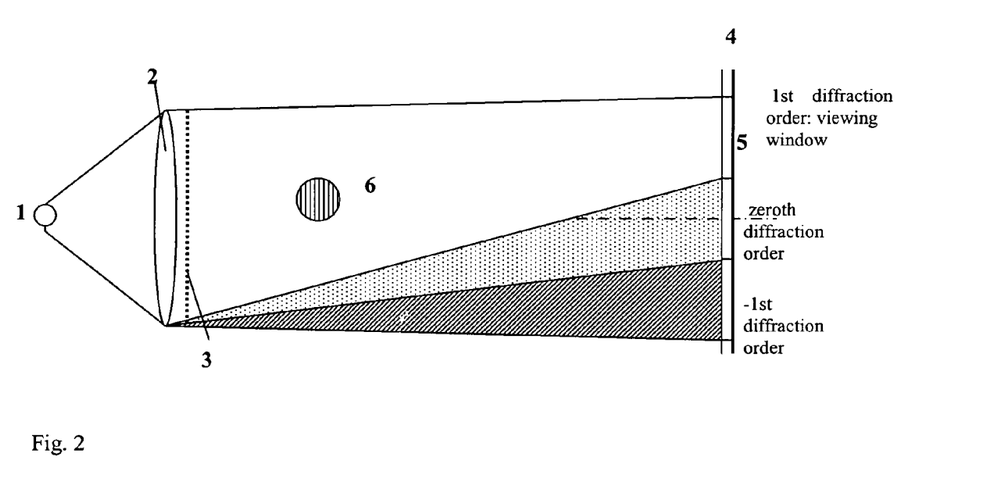
FIG. 2 is a general illustration of a device for reconstructing video holograms showing a three-dimensional scene which can be viewed through a viewing window.

Being the Fourier transform, the selected $1^{st}$ diffraction order forms the reconstruction of the hologram-bearing medium 3. However, it does not represent the actual three-dimensional scene 6. It is only used as the viewing window 5 through which the three-dimensional scene 6 can be observed (see FIG. 2). The actual three-dimensional scene 6 is indicated in the form of a circle inside the bundle of rays of the $1^{st}$ diffraction order. The scene is thus located inside the reconstruction frustum which stretches between the hologram-bearing medium 3 and the viewing window 5. The scene 6 is rendered as the Fresnel transform of the hologram-bearing medium 3, whereas the viewing window 5 is a part of the Fourier transform.

FIG. 3 shows the corresponding holographic encoding. The three-dimensional scene is composed of discrete points. A pyramid with the viewing window 5 being the base and the selected point 7 in the scene 6 being the peak, is prolonged through this point and projected on to the hologram-bearing medium 3. A projection area 8 is created in the hologram-bearing medium 3 that point being holographically encoded in said projection area. The distances between the point 7 to the cells of the hologram-bearing medium 3 can be determined in order to calculate the phase values. This reconstruction allows the size of the viewing window 5 to be constrained by the periodicity interval. If, however, the point 7 was encoded in the entire hologram-bearing medium 3, the reconstruction would extend beyond the periodicity interval. The viewing zones from adjacent diffraction orders would overlap, which would result in the viewer seeing a periodic continuation of the point 7. The contours of a thus encoded surface would appear blurred due to multiple overlapping.

Figure 4:
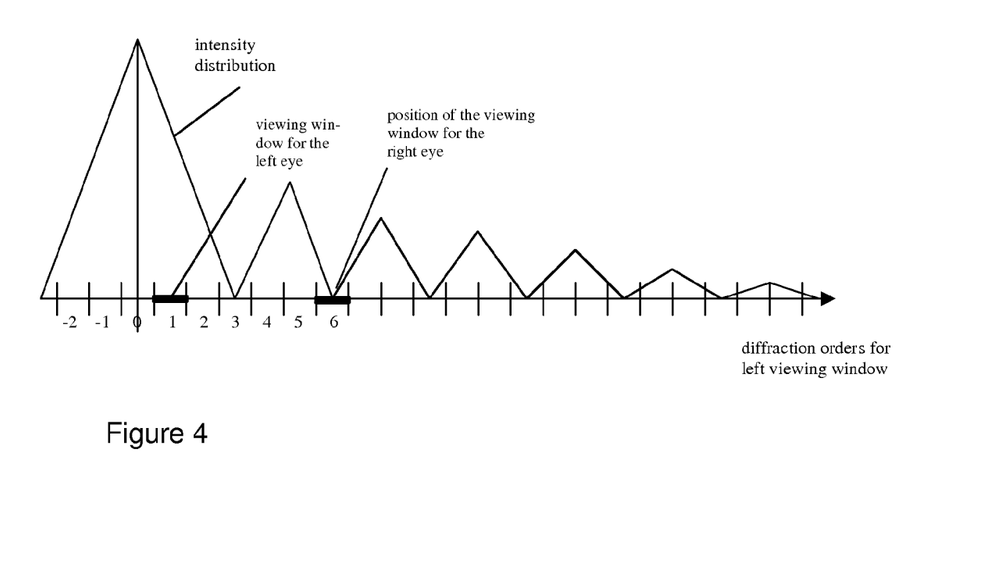
FIG. 4 is a diagram showing the light intensity distribution in the viewing plane depending on the diffraction orders.

The intensity decrease towards higher diffraction orders is taken advantage of to suppress cross-talking to other viewing windows. FIG. 4 shows schematically a light intensity distribution over the diffraction orders, said distribution being determined by the width of the openings in the CGH. The abscissa shows the diffraction orders. The $1^{st}$ diffraction order represents the viewing window 5 for the left eye, i.e. the left viewing window, through which the three-dimensional scene can be viewed. Cross-talking into a viewing window for the right eye is suppressed by the decrease in light intensity towards higher diffraction orders and, additionally, by the zero point of the intensity distribution.

Figure 5:
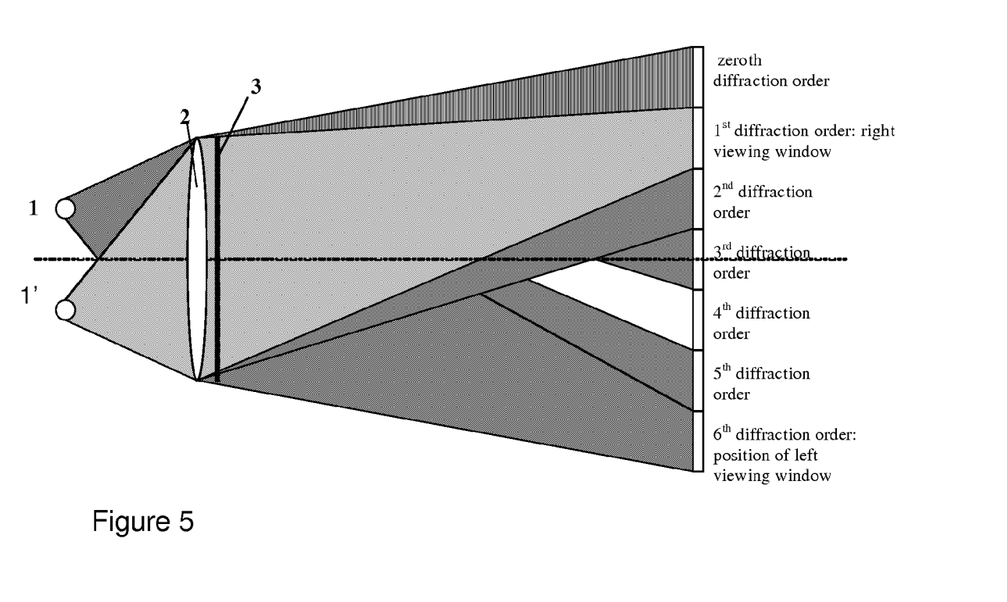
FIG. 5 is a general illustration of a device for reconstructing video holograms showing the position of the viewing windows for both eyes of a viewer with regard to the diffraction orders to prevent cross-talking.
Figure 6:
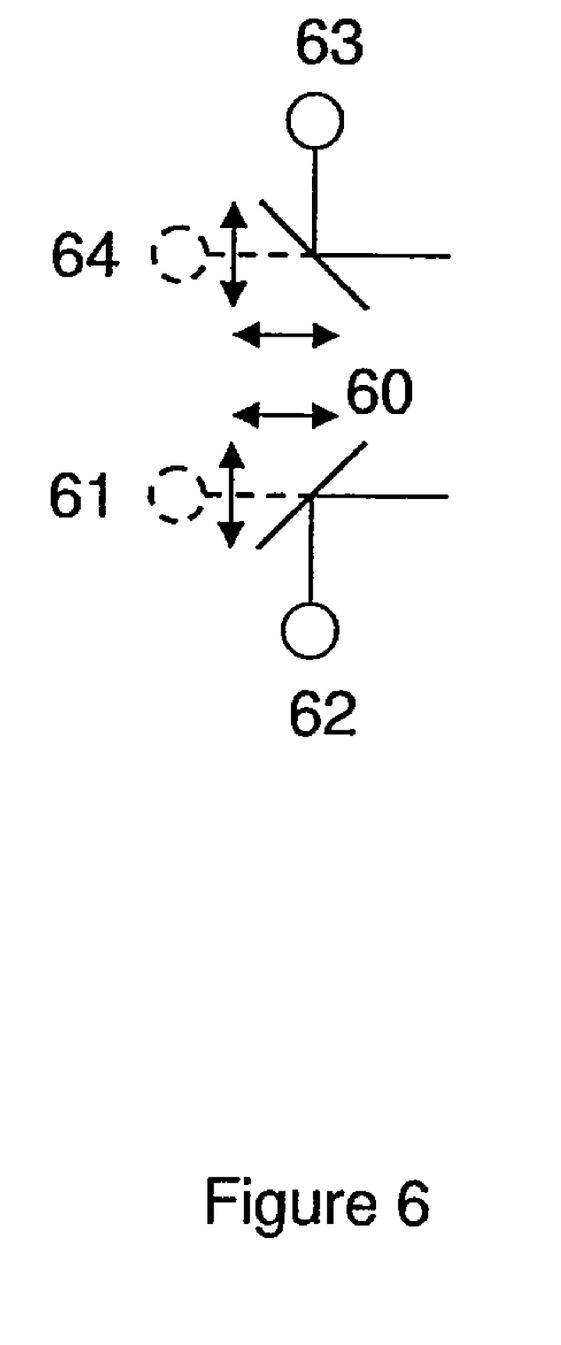
FIG. 6 is a general illustration of a device for reconstructing video holograms showing the position of the viewing windows for both eyes of a viewer with regard to the diffraction orders to prevent cross-talking, where 61 and 64 are virtual point sources which arise as a result of movable mirrors 60 from point sources 62 and 63.
Figure 7:
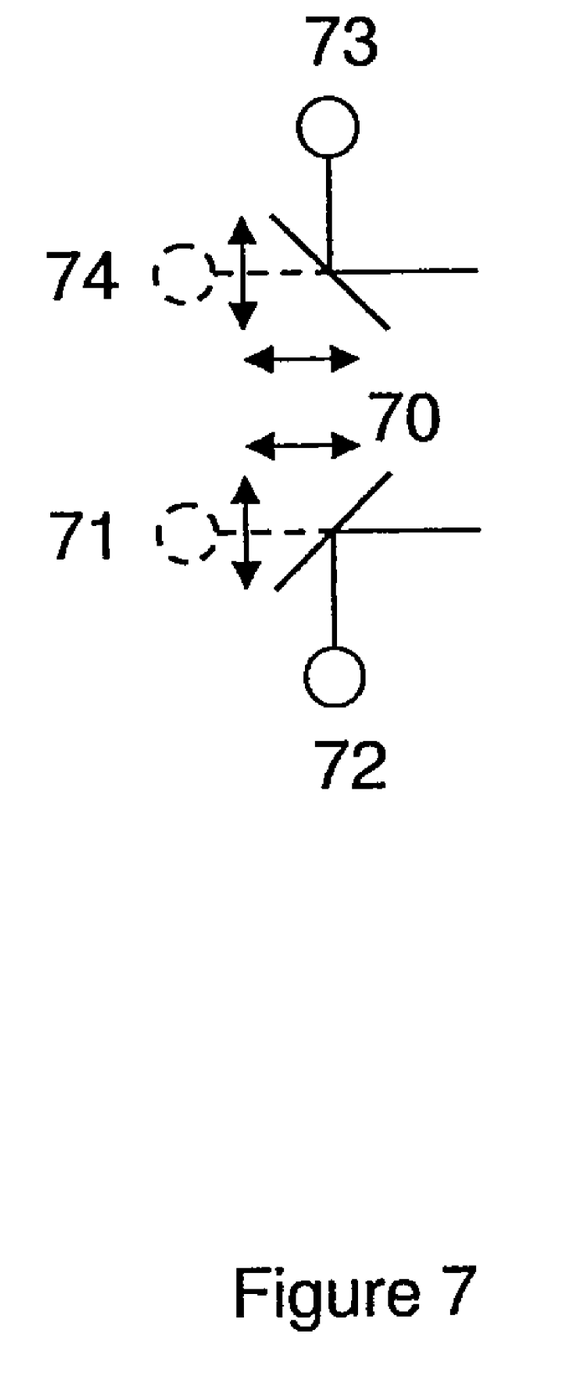
FIG. 7 is a general illustration of a device for reconstructing video holograms showing the position of the viewing windows for both eyes of a viewer with regard to the diffraction orders to prevent cross-talking, where 71 and 74 are virtual line-shaped sources shown in cross section which arise as a result of movable mirrors 70 from line-shaped sources 72 and 73.
Figure 8:
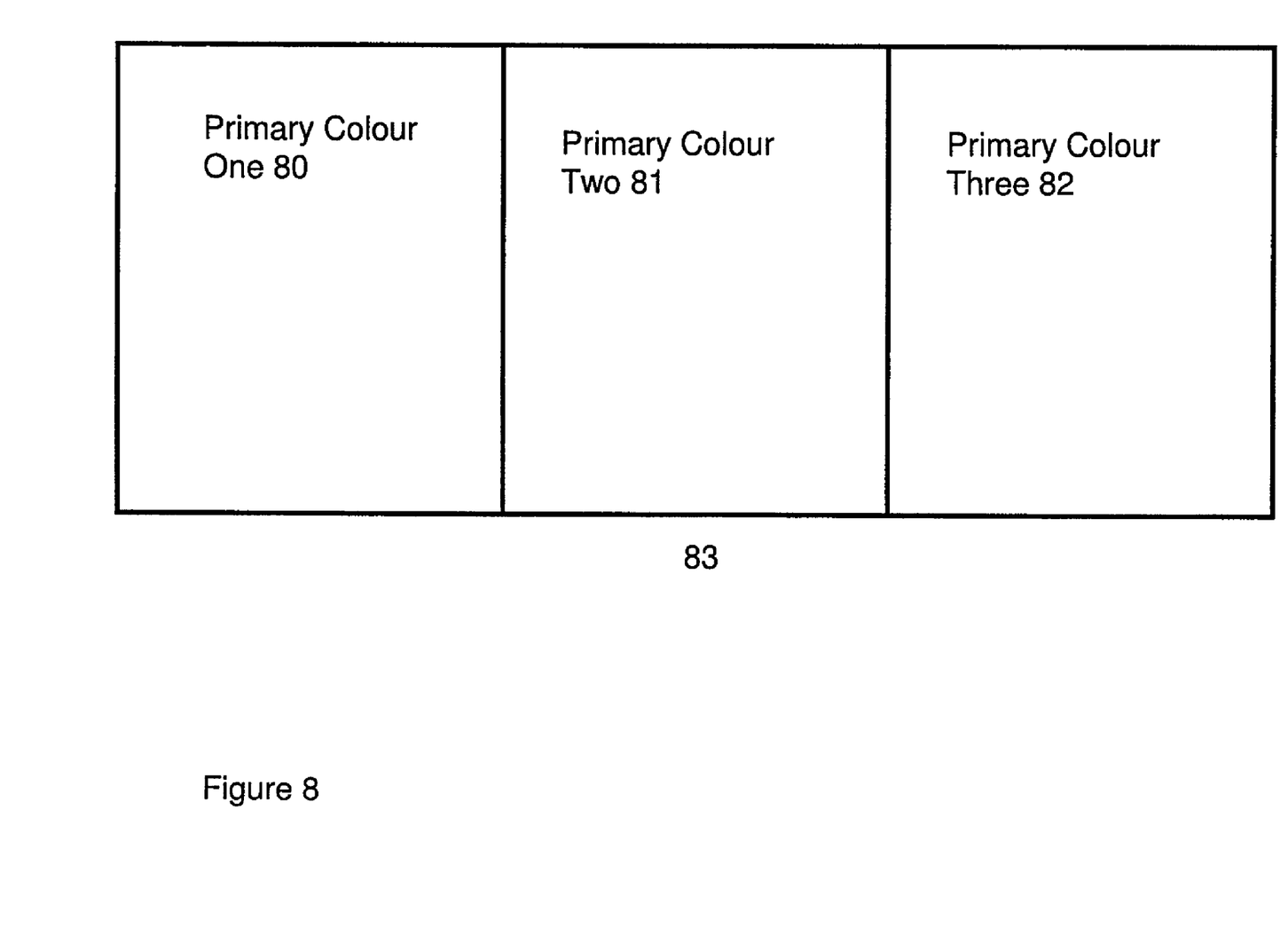
FIG. 8 is a schematic diagram of a cell 83 which has three openings 80, 81 and 82 which correspond to three primary colors.
Figure 9:
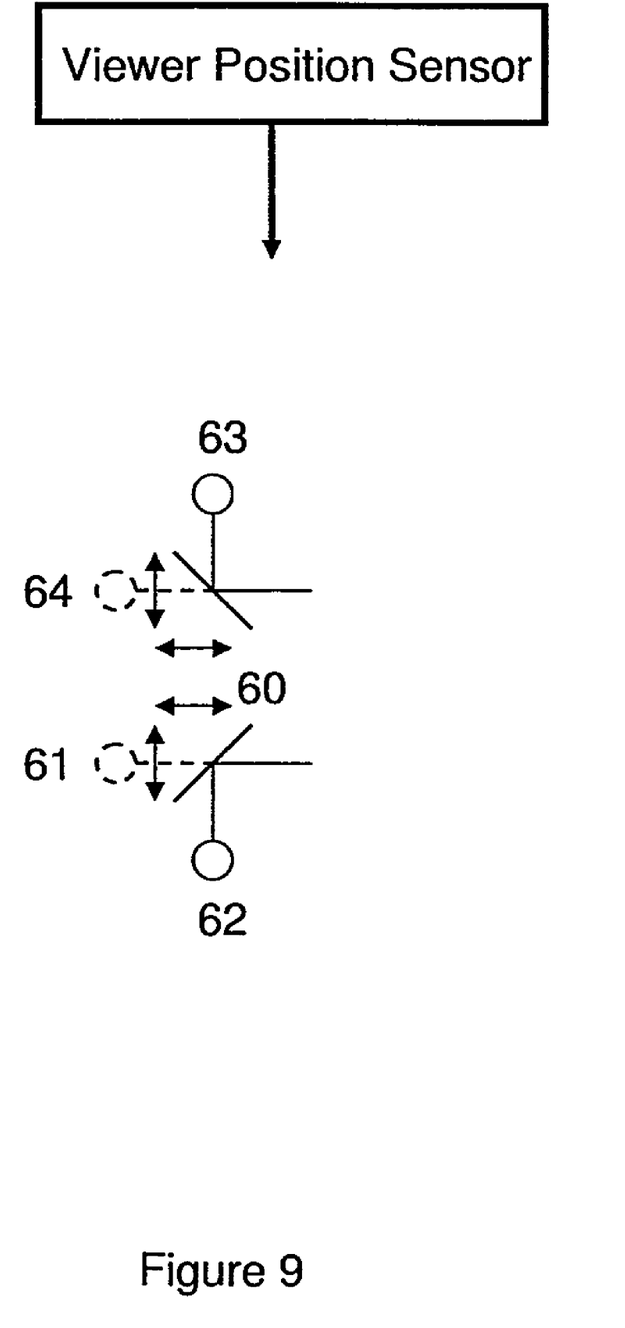
FIG. 9 is a general illustration of a device for reconstructing video holograms showing the position of the viewing windows for both eyes of a viewer with regard to the diffraction orders to prevent cross-talking, where 61 and 64 are virtual point sources which arise as a result of movable mirrors 60 from point sources 62 and 63, where a viewer position sensor is present.

Of course, the viewer can view the scene 6 of the hologram 3 with both eyes (see FIG. 5). For the right eye, the right viewing window 5' represented by the $-1^{st}$ diffraction order of the light source 1' was chosen. As can be seen in the drawing, this light influences the left eye at a very low intensity. Here, it corresponds to the $-6^{th}$ diffraction order.

For the left eye, the $1^{st}$ diffraction order corresponding to the position of the light source 1 was chosen. The left viewing window 5 is formed likewise. According to this invention, the corresponding three-dimensional scenes 6 and 6' (not shown) are reconstructed using the light sources 1 and 1' in a fix position in relation to the eyes. For this, the hologram 3 will be re-encoded when the light sources 1 and 1' are turned on. Alternatively, the two light sources, 1 and 1', can simultaneously reconstruct the hologram 3 in the two viewing windows 5 and 5'.

If the viewer moves, the light sources 1 and 1' are tracked so that the two viewing windows 5 and 5' remain localised on the eyes of the viewer. The same applies for movements in the normal direction, i.e. perpendicular to the video hologram.

Further, several viewers can view a three-dimensional scene if additional viewing windows are created by turning on additional light sources.

The invention claimed is:

1. A method for reconstructing a three-dimensional scene using a reconstruction device including a light source, an optical system and a hologram encoded on a hologram-bearing medium having a matrix of cells; the hologram-bearing medium and the optical system being illuminated by the light source; and the optical system imaging the light source into an image plane of the light source; the method comprising the steps of:
    (i) the optical system generating an inverse Fourier transform of the hologram encoded on the hologram-bearing medium at the image plane of the light source;
    (ii) providing a viewing window at the image plane of the light source, the viewing window being the location where an observer places at least one eye to view the holographic reconstruction representing the three-dimensional scene, and, the size of the viewing window being no larger than a single diffraction order of the light diffracted by the hologram-bearing medium;
    (iii) encoding the hologram on the hologram-bearing medium to reconstruct a given object point of the three-dimensional scene, when seen from the viewing window, in only a limited region of the hologram-bearing medium, so that the inverse Fourier transform in the viewing window is restricted to a single diffraction order of the light diffracted by the hologram-bearing medium; and
    (iv) forming the holographic reconstruction of the three-dimensional scene from the hologram encoded in the hologram bearing medium within a reconstruction frustum stretching between the hologram-bearing medium and the viewing window.

2. The method of claim 1, wherein the viewing window is positioned in relation to an eye of an observer.

3. The method of claim 1 in which the holographic reconstruction of the three-dimensional scene is made up of multiple discrete points and the hologram on the hologram-bearing medium comprises the limited region with information needed to reconstruct one such single point in the reconstruction, the point being visible from the viewing window, and is characterized in that the limited region:
    (a) is encoded with information for that single point in the reconstruction and
    (b) is the only limited region in the hologram encoded with information for that point, and
    (c) is restricted in size to form a portion of the entire hologram, the size being such that multiple reconstructions of that point caused by higher diffraction orders are not visible at the viewing window.

4. The method of claim 3 in which the limited region has been generated by a projection from the viewing window through the single point onto the hologram-bearing medium.

5. The method of claim 1 comprising the step of time sequentially re-encoding a hologram on the hologram-bearing medium for one eye and then the other eye of an observer.

6. The method of claim 1 in which the holographic reconstruction representing the three-dimensional scene is described by the Fresnel transform of the hologram being encoded in the hologram-bearing medium and the holographic reconstruction representing the three-dimensional scene is not described by the Fourier transform of the hologram being encoded in the hologram-bearing medium.

7. The method of claim 1 in which the size of the viewing window is calculated by a computing means in dependence of the extension of the periodicity interval of the hologram bearing medium.

8. The method of claim 1 in which the size of the viewing window is smaller than the size of the hologram-bearing medium.

9. The method of claim 1 in which there are separate viewing windows, one for each eye of the observer.

10. The method of claim 9 in which each viewing window is approximately 1 cm×1 cm.

11. The method of claim 9 in which the locations of an observer's eyes are tracked and the positions of the viewing windows are altered so that the observer can maintain a view through each viewing window even when moving his or her head.

12. The method of claim 1 in which the light source includes one or more individual light sources.

13. The method of claim 1, in which the light source is a lineshaped light source.

14. The method of claim 1, in which the light source is a real light source.

15. The method of claim 1, in which the light source is a point light source.

16. The method of claim 1, wherein several light sources are turned on to generate viewing windows for several observers.

17. The method of claim 1, wherein information required to determine the position of the light source is provided by at least one position sensor that measures the position of the observer.

18. The method of claim 1 comprising the steps of assigning a first viewing window to a first eye of a viewer and also assigning a second viewing window to the other eye of the viewer, the second viewing window being generated using a second light source.

19. The method of claim 18, wherein the optical system and the hologram-bearing medium are arranged so that higher diffraction orders of the hologram for the first viewing window have a zero point or an intensity minimum at the position of the second viewing window.

20. The method according to claim 19, wherein the hologram-bearing medium is re-encoded for the second eye at the same time as the second viewing window is generated.

21. The method of claim 1, wherein the holographic reconstruction is in color, and wherein the hologram-bearing medium is composed of cells arranged in a regular pattern with at least three openings per cell, representing the three primary colors, the phase or the amplitude or the phase and the amplitude of light from the light source being controllable by said openings by encoding the hologram into the hologram bearing medium, and said openings being encoded individually for each primary color.

22. The method of claim 1, wherein a color reconstruction is achieved by at least three reconstructions in the individual primary colors, generated sequentially.

23. The method of claim 1, in which the hologram-bearing medium is a TFT display.

24. The method of claim 1 in which the hologram-bearing medium controls phase of light of the light source.

25. The method of claim 1 in which the hologram-bearing medium controls amplitude of light of the light source.

26. The method of claim 1 in which the hologram-bearing medium controls phase and amplitude of light of the light source.

27. A reconstruction device for reconstructing a three-dimensional scene including a light source, an optical system and a hologram encoded on a hologram-bearing medium having a matrix of cells, the hologram-bearing medium and the optical system being illuminated by the light source and the optical system imaging the light source into an image plane of the light source; in which:
  (i) the optical system generates an inverse Fourier transform of the hologram encoded on the hologram-bearing medium at the image plane of the light source; and
  (ii) the reconstruction device generates a viewing window in the image plane of the light source, the viewing window being the location where an observer places at least one eye to view the holographic reconstruction representing the three-dimensional scene; and
  (iii) the reconstruction device forms the holographic reconstruction of the three-dimensional scene from the hologram encoded in the hologram bearing medium within a reconstruction frustum stretching between the hologram-bearing medium and the viewing window.

28. The device of claim 27 further including a position sensor to track the location of the observer's eye or eyes.

29. The device of claim 27 in which the device includes a TFT flat screen as the hologram-bearing medium.

30. The device of claim 27 in which the device is a television.

31. The device of claim 27 in which the device is a multimedia display device.

32. The device of claim 27 in which the device is a gaming device.

33. The device of claim 27 in which the device is a medical image display device.

34. The device of claim 27 in which the device is a military information display device.

35. The device of claim 27, wherein the viewing window is positioned in relation to an eye of an observer.

36. The device of claim 27 in which there are separate viewing windows, one for each eye of the observer.

37. The device of claim 36 in which the locations of an observer's eyes are tracked and the positions of the viewing windows are altered so that the observer can maintain a view through each viewing window even when moving his or her head.

38. The device of claim 27 in which the light source includes one or more individual light sources.

39. The device of claim 27, in which the light source is a lineshaped light source.

40. The device of claim 27, in which the light source is a real light source.

41. The device of claim 27, in which the light source is a point light source.

42. The device of claim 27, in which the hologram-bearing medium is a TFT display.

43. The device of claim 27 in which the hologram-bearing medium controls phase of light of the light source.

44. The device of claim 27 in which the hologram-bearing medium controls amplitude of light of the light source.

45. The device of claim 27 in which the hologram-bearing medium controls phase and amplitude of light of the light source.

* * * * *